United States Patent [19]
Adcock

[11] 3,804,138
[45] Apr. 16, 1974

[54] DOZER-TYPE CLEARING BLADE HAVING REPLACEABLE TEETH

[76] Inventor: James F. Adcock, Box 271, Queen City, Tex. 75572

[22] Filed: Feb. 21, 1973

[21] Appl. No.: 334,286

[52] U.S. Cl................................. 144/34 F, 83/839
[51] Int. Cl............................................. A01g 23/08
[58] Field of Search............... 144/34 A, 34 F, 34 B, 144/309 AC; 83/839

[56] References Cited
UNITED STATES PATENTS
3,330,314   7/1967   Dickson............................. 144/34 F
3,033,253   5/1962   Purdy................................. 144/34 F Primary Examiner—Andrew R. Juhasz
Assistant Examiner—W. D. Bray
Attorney, Agent, or Firm—Cushman, Darby & Cushman

[57] ABSTRACT

This invention is related to an improved toothed dozer clearing blade having teeth that are replaceable, exchangeable, and reversible so as to compensate for uneven wear as well as decrease cost in rebuilding worn blades.

7 Claims, 4 Drawing Figures

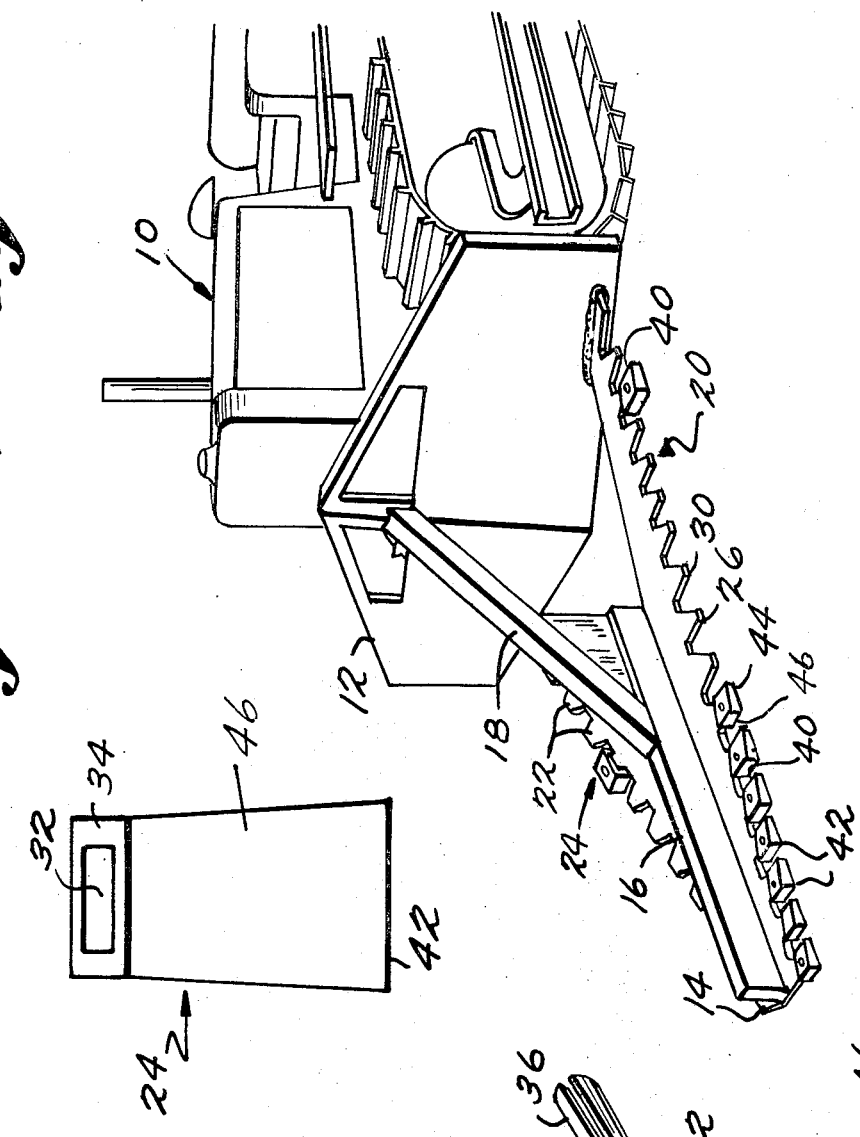
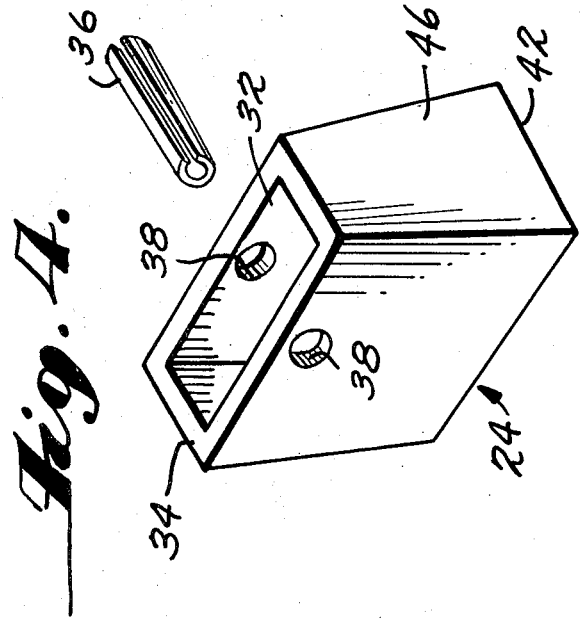

DOZER-TYPE CLEARING BLADE HAVING REPLACEABLE TEETH

BACKGROUND OF THE INVENTION

Clearing blades are normally used in conjunction with a track-type earth moving tractor that clears land by the action of the blade being pushed ahead of the moving tractor. Such blades are flat, horizontal, taper forwardly and have integral teeth along their opposite sides that break, tear, and abrade away trees and brush. After these teeth become worn, attempts to rebuild them are very expensive, cumbersome and require many man-hours of work. Te conventional blade weighs approximately one ton and has to be removed from the tractor before it can be worked on. Needless to point out, the removal process requires heavy lifting equipment, several men, as well as many hours. The servicing of the blades is further complicated in that the teeth are worked on by expensive welding and grinding machines which themselves require skilled operators. It is thus apparent that present rebuilding techniques for servicing clearing blades are wasteful of manpower, time and capital.

Moreover, conventional clearing blades do not wear evenly in that the teeth on one side of the blade may become worn more than those on the other and/or a number of the teeth on one side wear to a greater extent than the corresponding teeth on the other.

BRIEF SUMMARY OF THE INVENTION

It is an object of the instant invention to overcome the aforediscussed drawbacks. The invention accomplishes this object by providing a dozer clearing blade with teeth that are both exchangeable and reversible.

In order to compensate for uneven wear as well as to minimize the cost and time expenditure for servicing the teeth on these cumbersome blades, a plurality of replaceable, exchangeable and reversible boot-type teeth are employed. Each of these boot-type teeth is detachably fastened to a stub tooth on the clearing blade by a conventional roll pin. The teeth are made of a heavy duty material so as to increase the useable life.

A boot-type tooth of the present invention is generally wedge-shaped, with its thickness progressively decreasing from front to rear. A cavity or socket in the base of each tooth is complementary to the stub teeth on the blade and a simple device is used to detachably secure the boot-type teeth to the stub teeth. Inasmuch as the boot-type teeth are relatively small and easy to handle, they can be removed from the clearing blade by a tractor operator and new ones installed.

Often, as is the case, the clearing blade teeth wear unevenly along one side thereof. In these instances, one benefit of the detachable boot-type teeth is that the worn teeth can be interchanged with other teeth on the blade having less wear. In this manner, the useful life of the clearing blade is increased as well as that of the boot-type teeth. Also, if uneven wear occurs more on one edge of the blade as opposed to the other edge thereof, the reversible feature of the instant invention permits the boot-type teeth to be transferred from one edge to the other. To accomplish this reversing operation, an operator removes the boot-type teeth from a worn edge of the clearing blade, then inverts and transfers the same to the other edge of the dozer blade for attachment thereon. Thusly not only does the detachable and replaceable feature of the present invention permit teeth to be detached and selectively positioned to any portion along the longitudinal extent of the corresponding edge of the blade so as to compensate for uneven wear, but also to be attached to the other side of the blade.

Other objects, advantages and novel features of the invention will become apparent from the following detailed description of the invention, when considered in conjunction with the accompanying drawings.

BRIEF DESCRIPTION OF THE DRAWINGS

FIG. 1 is a fragmentary perspective view of an earth moving tractor equipped with a dozer clearing blade having exchangeable and reversible teeth in accordance with this invention;

FIG. 2 is an enlarged fragmentary plan vieew of a portion of FIG. 1 showing the attachment of one of the exchangeable and reversible boot-type teeth to the clearing blade;

FIG. 3 is a front elevational view of the boot-type tooth shown in FIG. 2; and

FIG. 4 is an exploded perspective view of the boot-type tooth and its attached pin shown in FIG. 2.

DETAILED DESCRIPTION OF THE PREFERRED EMBODIMENT

Referring now to the drawings, there is shown a conventional earth moving tractor 10 having attached to the forward end thereof an upright dozer-type blade 12 generally V-shaped in plan view. Secured, as by welding, to the lower portion of the blade, and extending forwardly thereof is a forwardly tapering horizontal clearing blade 14 having on its upper side a longitudinal reinforcing rib 16. An inclined brace 18 extends between the rib and an upper portion of the dozer-type blade. The opposite sides of the clearing blade are provided with laterally extending teeth 20 adapted to engage brush, trees, and the like, closely adjacent the ground and to break, tear or otherwise sever and remove the same as the clearing blade is moved forwardly with the tractor. The V-shaped dozer blade then pushes the debris to the side.

According to this invention, the teeth are formed by stub-type teeth 22 or projections, all of the same size, integral with the clearing blade to which are removably attached boot-type teeth 24, also all of the same size and configuration. Each stub tooth 22 is generally flat, and of substantially uniform thickness and has front 26 and rear 28 flat faces which converge laterally outwardly, each with the same angle of convergence. Each stub tooth is truncated so as to be provided with a flat outer face 30 which is inclined inwardly and forwardly at the same angle of taper as the blade.

Each boot-type tooth is provided with a cavity or socket 32 in its base 34 substantially complementary to a corresponding stubtooth, and is detachably secured to the latter, as by a roll pin 36 extending through vertically aligned openings 38 in the boot-type tooth 20 and the corresponding stub tooth 22. Desirably, each replaceable boot-type tooth is made of a heavy duty material, e.g., steel, that has been either forged, cast or machined to its desired configuration. Because of its relatively small size each replaceable tooth can be hardened, if desired, by a heat treating operation. This is not feasible for the integral teeth on a conventional clearing blade because of the size and weight of the latter. While a particular shape of the replaceable tooth is illustrated in the drawings, other configurations are included within the scope of the invention. The configuration illustrated, however, has been found to be especially effective on a generally V-shaped clearing blade of the type shown.

The back faces 40 of each replaceable tooth are of generally rectangular configuration, while each such tooth is of progressively increasing thickness toward its front outer corner 42. Accordingly, the outer 44 and front 46 faces of the replaceable teeth are of generally trapezoidal configuration, with the greatest thickness at the corner 42. Thus, each replaceable tooth may be said to be somewhat wedge-shaped, when viewed from the outer side as shown in FIG. 1, and also when viewed from the front as shown in FIGS. 3 and 4. The thickness increase in uniform upwardly and downwardly, with respect to the plane of the blade so as to permit the teeth to be interchangeable from one side of the blade to the other. The outer face 44 of each tooth 24 is inclined outwardly and forwardly at a slgihtly greater angle than the angle of taper of the blade. The rear face 40 of each tooth 24 is inclined slightly outwardly forwardly.

All of the replaceable teeth 24 are of substantially the same size and configuration. Thus, if the teeth become irregularly worn in use, they can be readily rearranged so as to replace the teeth with the greatest wear with teeth having less wear from another region along the blade. Similarly, if the teeth along one edge of the blade become worn more than those along the opposite edge, the teeth along the one edge can be interchanged with those along the opposite edge to thus achieve greater life for the entire blade.

The rebuilding of a conventional clearing blade, which has no replaceable teeth, requires the use of expensive welding, grinding, and lifting equipment, since, as aforesaid, a clearing blade of the type shown herein normally weighs approximately a ton or more. The rebuilding of worm teeth of a conventional blade normally is accomplished by building up worn areas with weldments, necessitating the services of a welder, and expensive alloy welding rods. In contrast, the replaceable teeth embodying this invention may be replaced by an operator of the tractor using only a hammer and punch to remove and replace roll pins. A conventional clearing blade, which normally has about 70 integral teeth, requires about 20–30 hours to rebuild when worn, whereas the teeth of the blade embodying this invention can be replaced in about 1 hour.

I claim:

1. A clearing blade assembly adapted to be attached to the front of a self-propelled vehicle comprising:
    a forwardly tapering horizontal blade;
    a row of stub teeth integral with and extending along each lateral edge of said blade, said stub teeth being of the same size and configuration;
    replaceable teeth having cavities in their bases complementary to and receiving said stub teeth, said replaceable teeth being of the same size and configuration; and
    means detachably securing said replaceable teeth to said stub teeth.

2. A clearing blade assembly according to claim 1 including a dozer blade generally V-shaped in plan secured to the rear of the clearing blade.

3. A clearing blade assembly according to claim 1 in which the securing means comprises a pin extending through vertically aligned openings in the stub teeth and the replaceable teeth.

4. A clearing blade assembly according to claim 1 in which each stub tooth is of generally uniform thickness throughout.

5. A clearing blade assembly according to claim 4 in which each replaceable tooth is generally trapezoidal in plan view and progressively increases in thickness uniformly upwardly and downwardly toward the outer front corner thereof.

6. A clearing blade assembly according to claim 1 in which each replaceable tooth has a flat, upright, generally trapezoidal outer face inclined outwardly and forwardly at a greater angle of taper than the blade.

7. A replaceable tooth adapted to be detachably secured to and to extend laterally from an edge of a horizontal forwardly tapering clearing blade, comprising a body having a cavity in the base thereof for reception of a complementary stub tooth on the blade and generally trapezoidal outer and front faces, said body being of progressively increasing thickness toward the corner formed by the intersection of said faces.

* * * * *